United States Patent
Takei

(10) Patent No.: US 11,595,567 B2
(45) Date of Patent: Feb. 28, 2023

(54) IMAGING APPARATUS, METHOD FOR CONTROLLING, AND RECORDING MEDIUM

(71) Applicant: CANON KABUSHIKI KAISHA, Tokyo (JP)

(72) Inventor: Noriyuki Takei, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/501,651

(22) Filed: Oct. 14, 2021

(65) Prior Publication Data
US 2022/0124243 A1    Apr. 21, 2022

(30) Foreign Application Priority Data
Oct. 20, 2020  (JP) .............................. JP2020-176362

(51) Int. Cl.
H04N 5/232    (2006.01)
G06F 3/01    (2006.01)

(52) U.S. Cl.
CPC ......... *H04N 5/23219* (2013.01); *G06F 3/013* (2013.01); *H04N 5/23245* (2013.01); *H04N 5/232127* (2018.08); *H04N 5/232941* (2018.08); *H04N 5/232945* (2018.08)

(58) Field of Classification Search
CPC ......... H04N 5/23219; H04N 5/232127; H04N 5/23245; H04N 5/232941; H04N 5/232945; G06F 3/013
See application file for complete search history.

(56) References Cited

U.S. PATENT DOCUMENTS 5,758,201 A * 5/1998 Watanabe .............. G03B 13/02
396/51
2014/0015989 A1* 1/2014 Shibuno ........... H04N 5/232123
348/208.12

FOREIGN PATENT DOCUMENTS

JP          H06148504 A      5/1994

* cited by examiner

*Primary Examiner* — Yogesh K Aggarwal
(74) *Attorney, Agent, or Firm* — Canon U.S.A., Inc. IP Division

(57) ABSTRACT

An imaging apparatus includes a finder, a proximity detection unit configured to detect a proximity of an object to the finder, a receiving unit configured to receive a line-of-sight input, and a control unit configured to perform control to prohibit, after the proximity of the object is detected by the proximity detection unit, a specific function based on a position input by the line-of-sight input of the user from being performed until a first period of time has elapsed even in a case where a predetermined condition is satisfied, and allow, after the proximity of the object is detected by the proximity detection unit and the first period of time has elapsed, the specific function based on the position input by the line-of-sight input of the user to be performed, in response to satisfaction of the predetermined condition.

11 Claims, 5 Drawing Sheets

IMAGING APPARATUS, METHOD FOR CONTROLLING, AND RECORDING MEDIUM

BACKGROUND

Field

The present disclosure relates to an imaging apparatus that support a line-of-sight input based on a line of sight of a user, and a method for controlling the imaging apparatus.

Description of the Related Art

Conventionally, there has been known a camera configured to detect a line of sight of a user (photographer or videographer) to detect which position (region) the user is viewing in the finder, to control an imaging function, such as an automatic focus adjustment. Japanese Patent Application Laid-Open No. 6-148504 discloses an imaging apparatus having a function of detecting a line of sight of a user. When a line of sight of a user is fixed on some region for a time (a gaze time) exceeding a predetermined threshold value, the imaging apparatus determines that the user is gazing the region and selects a focus detection region.

In Japanese Patent Application Laid-Open No. 6-148504, even in a case where the user repeats putting an eye to and away from a finder of the imaging apparatus, the predetermined threshold value for determining a gaze is kept constant. Consequently, even when the user does not intend to make a selection based on the line of sight, such as when the user just wants to check an entire live view image or composition immediately after putting an eye to the finder, a gaze is determined to be present, and the focus detection region is inadvertently selected at a position not intended by the user. Under such a situation that the user repeats putting an eye to and away from the finder while recording a moving image, the focus detection region may be inadvertently selected at an unintended position, which undesirably results in a loss of an imaging opportunity. On the other hand, increasing the threshold value undesirably leads to an increase in a time taken to select a focus detection region by the line of sight, which also undesirably results in a loss of an imaging opportunity.

SUMMARY

Various embodiments of the present disclosure reduce execution of unintended processing based on a line of sight input immediately after detection of eye proximity.

According to one embodiment of the present disclosure, an imaging apparatus includes a finder, a proximity detection unit configured to detect proximity of an object to the finder, a receiving unit configured to receive a line-of-sight input performed by a line of sight of a user looking into the finder, and a control unit configured to perform control to prohibit, after the proximity of the object is detected by the proximity detection unit, the imaging apparatus from performing a specific function based on a position input by the line-of-sight input of the user until a first period of time has elapsed even in a case where a predetermined condition is satisfied, and allow the imaging apparatus to perform, after the proximity of the object is detected by the proximity detection unit and the first period of time has elapsed, the specific function based on the position input by the line-of-sight input of the user, in response to satisfaction of the predetermined condition.

Further features of the present disclosure will become apparent from the following description of example embodiments with reference to the attached drawings.

DESCRIPTION OF THE EMBODIMENTS

Example embodiments of the present disclosure will be described in detail below with reference to the accompanying drawings.

It is to be noted that the following example embodiments are merely provided as examples for implementing features of the present invention and can be appropriately modified or changed depending on individual constructions and various conditions of apparatuses to which the present invention is applied. Thus, the present invention is in no way limited to the following example embodiments.

Next, a representative example embodiment of the present disclosure will be described with reference to the drawings.

Figure 1A:
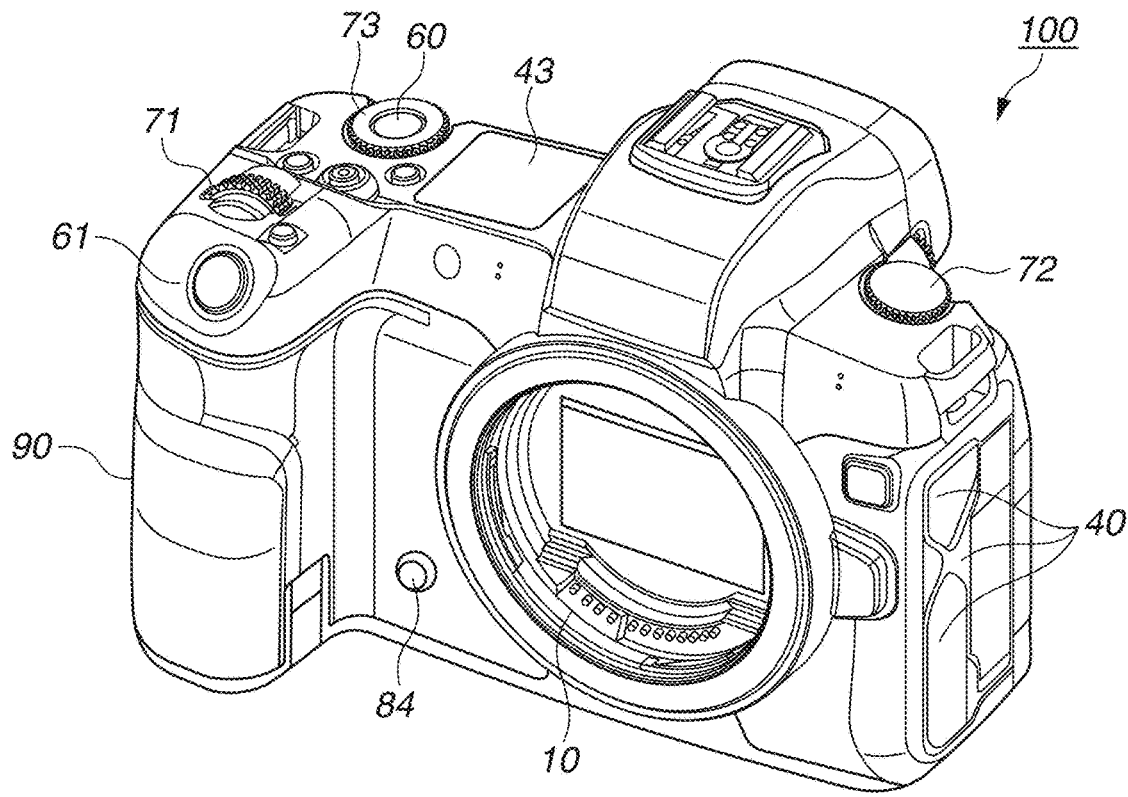
FIGS. 1A and 1B are diagrams illustrating external appearances of a digital camera according to one embodiment.
Figure 1B:
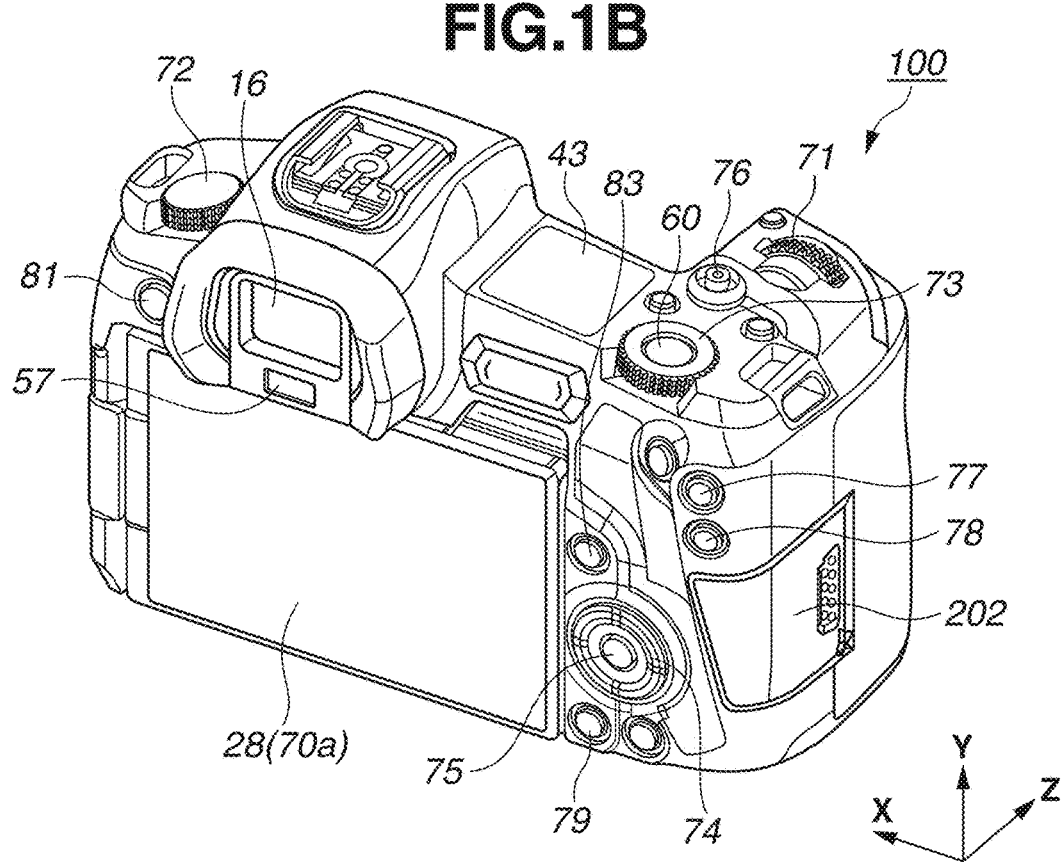

FIGS. 1A and 1B are diagrams illustrating exterior appearances of a digital camera 100 as an example of an apparatus to which the present disclosure can be applied. FIG. 1A is a perspective view of a front side of the digital camera 100, and FIG. 1B is a perspective view of a back side of the digital camera 100. In FIGS. 1A and 1B, a display unit 28 is a display unit disposed on the back side of the digital camera 100 and displays an image and various kinds of information. A touch panel 70a is an operation member on which a touch operation can be performed, and can detect a touch operation onto a display surface (an operation surface) of the display unit 28. An external finder display unit 43 is a display unit disposed outside a finder of the digital camera 100, and displays various setting values, such as a shutter speed and an aperture, of the digital camera 100.

A shutter button 61 is an operation unit for issuing an imaging instruction. A mode selection switch 60 is an operation unit for switching various kinds of modes. A terminal cover 40 is a cover that protects a connector (not illustrated) for a connection cable to be used for connecting an external apparatus and the digital camera 100 with each other. A main electronic dial 71 is a rotational operation member included in an operation unit 70, and a user can change setting values, such as the shutter speed and the aperture, by rotating the main electronic dial 71. A power switch 72 is an operation member for switching a power source of the digital camera 100 to ON and OFF. A sub electronic dial 73 is a rotational operation member included in the operation unit 70, and is used by the user to, for example, move a selection frame and jump to a subsequent image. A cross key 74 is included in the operation unit 70 and is an operation member having a push button capable of being pressed in four directions, and is used to execute an operation according to the direction in which the cross key 74 is pressed. A SET button 75 is included in the operation unit 70 and is a pressing button, and is mainly used to, for example, determine a selected item. A moving image button 76 is used to instruct the digital camera 100 to start or stop capturing (recording) a moving image. An automatic focus (AF)-ON button 77 is included in the operation unit 70, and an AF operation is started by pressing the AF-ON button 77. The AF operation is mainly started by pressing the shutter button 61, but the instruction to start the AF operation can also be issued by pressing the AF-ON button 77. The AF start instruction and the imaging instruction can be separately issued on the digital camera 100 having a setting for prohibiting the AF operation to be performed in response to pressing of the shutter button 61. The user can capture an image with the AF position fixed or even under a situation that AF is impossible by pressing the shutter button 61 after pressing the AF-ON button 77. An automatic exposure (AE) lock button 78 is included in the operation unit 70, and an exposure state can be fixed by pressing this button in an imaging standby state. In other words, the user can capture an image in an exposure state fixed to an exposure value desired by the user. A playback button 79 is included in the operation unit 70, and is an operation button for switching an imaging mode and a playback mode. The digital camera 100 transitions to the playback mode and displays the latest image among images recorded in a recording medium 200 on the display unit 28 by pressing the playback button 79 while the digital camera 100 is in the imaging mode. A menu button 81 is included in the operation unit 70, and a menu screen where various kinds of settings can be made is displayed on the display unit 28 by pressing this button. A multi-controller 83 is an operation member having a direction key capable of being operated in eight directions and a push button capable of being pressed, and is used for an operation according to the direction in which the multi-controller 83 is tilted. The user can intuitively make various kinds of settings using the cross key 74, the SET button 75, and the multi-controller 83 on the menu screen displayed on the display unit 28.

The operation unit 70 is a member for various kinds of operations as an input unit that receives an operation from the user. The operation unit 70 includes a push button, a rotational dial, a touch sensor, and the like, and includes at least the following operation units. The operation unit 70 includes the shutter button 61, the touch panel 70a, the main electronic dial 71, the power switch 72, the sub electronic dial 73, the cross key 74, the SET button 75, the moving image button 76, the AF-ON button 77, the AE lock button 78, the playback button 79, the menu button 81, and the multi-controller 83.

A communication terminal 10 is a communication terminal for the digital camera 100 to communicate with a lens unit 150 (detachably mountable), which will be described below. An eyepiece unit 16 is an eyepiece unit of a viewfinder (a finder configured to be looked into). Via the eyepiece unit 16, the user can visually check a video image displayed on an electronic view finder (EVF) 29, which is a display unit disposed in the finder. An eye proximity detection unit 57 is an eye proximity detection sensor that detects whether a user puts an eye to the eyepiece unit 16. A cover 202 is a cover of a slot in which the recording medium 200 is stored. A grip portion 90 is a holding portion in a shape that allows the user to easily grip it with his/her right hand when holding the digital camera 100. The shutter button 61 and the main electronic dial 71 are disposed at positions where the user can operate them with the index finger of his/her right hand in a state of holding the digital camera 100 while gripping the grip portion 90 with the little finger, the ring finger, and the middle finger of his/her right hand. The sub electronic dial 73 is disposed at a position where the user can operate it with the thumb of his/her right hand in the above described state.

Figure 2:
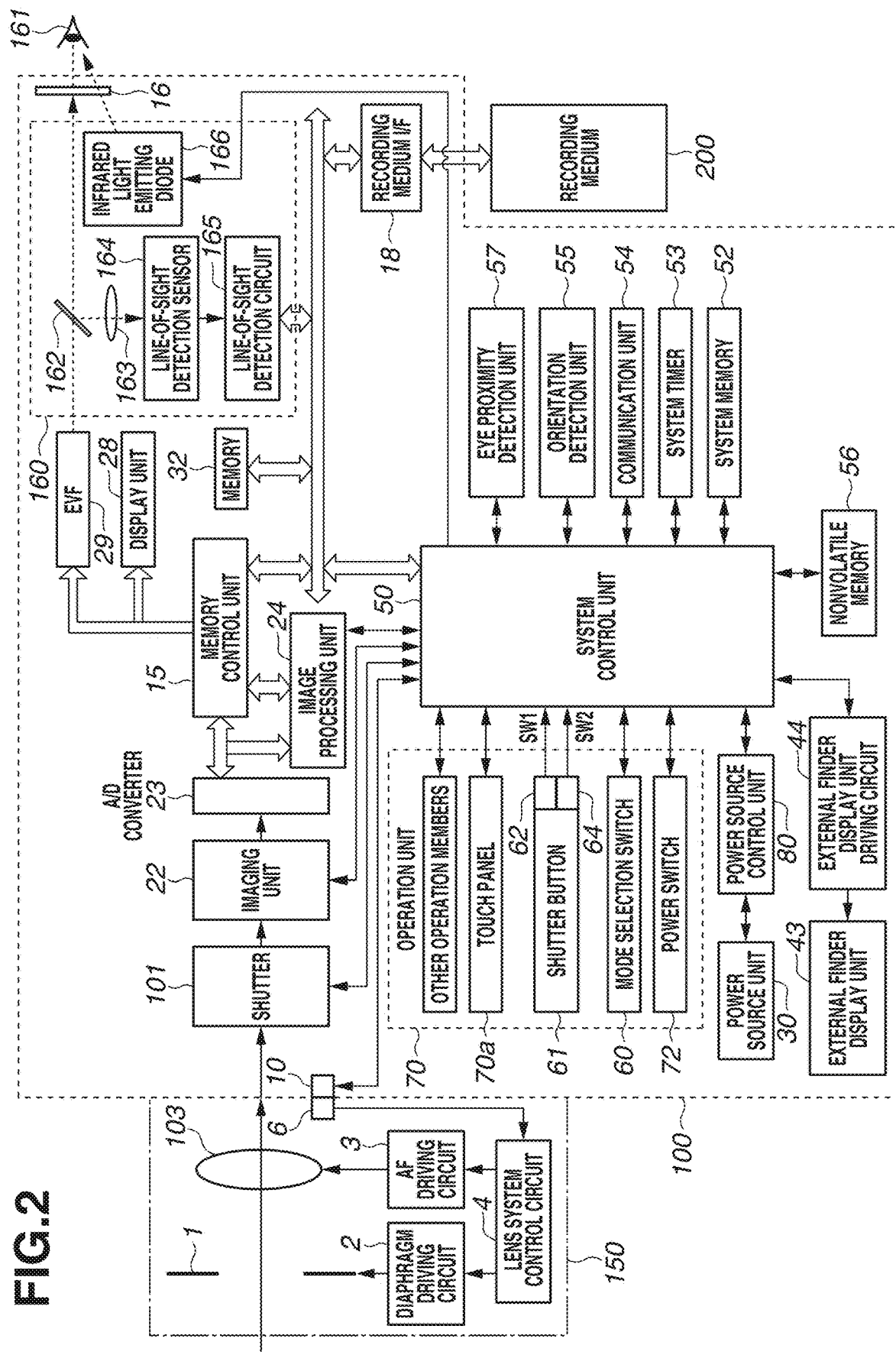
FIG. 2 is a block diagram illustrating a configuration of the digital camera according to one embodiment.

FIG. 2 is a block diagram illustrating an example of the configuration of the digital camera 100 according to the present example embodiment. In FIG. 2, the lens unit 150 is a lens unit on which an interchangeable imaging lens is mounted. A lens 103 is normally formed by a plurality of lenses, but is illustrated as one lens in FIG. 2 for the purpose of simplification. A communication terminal 6 is a communication terminal of the lens unit 150 to communicate with the digital camera 100. The lens unit 150 communicates with a system control unit 50 via the communication terminal 6 and the communication terminal 10, and controls a diaphragm 1 by an internally provided lens system control circuit 4 via a diaphragm driving circuit 2. Then, the lens unit 150 adjusts the focus of the lens 103 via an AF driving circuit 3 by displacing the lens 103.

A shutter 101 is a focal plane shutter capable of freely controlling an exposure time of an imaging unit 22 under control by the system control unit 50.

The imaging unit 22 is an image sensor including, for example, a charge-coupled device (CCD) sensor or a complementary metal-oxide semiconductor (CMOS) sensor, which converts an optical image into an electric signal. An analog-digital (A/D) converter 23 converts an analog signal output from the imaging unit 22 into a digital signal.

An image processing unit 24 performs predetermined pixel interpolation, resizing processing, such as a reduction, and color conversion processing on data output from the A/D converter 23 or data output from a memory control unit 15, which will be described below. The image processing unit 24 performs predetermined calculation processing using captured image data. The system control unit 50 controls an exposure and a distance measurement based on a calculation result acquired from the image processing unit 24. Based on this control, the digital camera 100 performs AF (automatic focus) processing, AE (automatic exposure) processing, and electro focus (EF) (flash preliminary emission) processing of a through-the-lens (TTL) method. The image processing unit 24 further performs predetermined calculation processing using the captured image data, and performs automatic white balance (AWB) processing of the TTL method based on the acquired calculation result.

The memory control unit 15 controls data transmission and receiving among the A/D converter 23, the image processing unit 24, and a memory 32. Data output from the A/D converter 23 is written into the memory 32 via the image processing unit 24 and the memory control unit 15, or is directly written into the memory 32 via the memory control unit 15. The memory 32 stores therein image data which is acquired by the imaging unit 22 and converted into digital data by the A/D converter 23, and image data to be displayed on the display unit 28 or the EVF 29. The memory 32 has a storage capacity sufficient to store a predetermined number of still images or a moving image and audio data lasting for a predetermined time.

The memory 32 also serves as a memory for an image display (a video memory). Display Image data written in the memory 32 is displayed by the display unit 28 and the EVF 29 via the memory control unit 15. The display unit 28 and the EVF 29 perform displaying on a display device, such as a liquid crystal display (LCD) and an organic electro luminescence (EL) display, according to the signal supplied from the memory control unit 15. A live view display (an LV display) can be performed by sequentially transferring data, which has been converted by the A/D converter 23 to digital data and stored into the memory 32, to the display unit 28 or the EVF 29 to display the data thereon. Hereinafter, the image displayed in the live view will be referred to as a live view image (an LV image).

An infrared light emitting diode 166 is a light emitting element for detecting a user's line-of-sight position on a screen in the finder, and irradiates a user's eyeball (eye) 161 with infrared light. The infrared light emitted from the infrared light emitting diode 166 is reflected on the user's eyeball (eye) 161, and the reflected infrared light reaches a dichroic mirror 162. The dichroic mirror 162 reflects only the infrared light thereon and allows visible light to be transmitted therethrough. The reflected infrared light of which optical path has been changed forms an image on an imaging plane of a line-of-sight detection sensor 164 via an imaging lens 163. The imaging lens 163 is an optical member included in a line-of-sight detection optical system. The line-of-sight detection sensor 164 includes an imaging device, such as a CCD image sensor.

The line-of-sight detection sensor 164 photoelectrically converts incident reflected infrared light into an electric signal and outputs the electric signal to a line-of-sight detection circuit 165. The line-of-sight detection circuit 165 includes at least one processor, and detects the user's line-of-sight position from an image or a motion of the user's eyeball (eye) 161 based on a signal output from the line-of-sight detection sensor 164 and outputs detection information to the system control unit 50. In the above described manner, a line-of-sight detection block 160 includes the dichroic mirror 162, the imaging lens 163, the line-of-sight detection sensor 164, the infrared light emitting diode 166, and the line-of-sight detection circuit 165. The line-of-sight detection block 160 is one of receiving units that receive a line-of-sight input.

In the present example embodiment, a line of sight is detected by a method called a corneal reflection technique using the line-of-sight detection block 160. The corneal reflection technique is a method that detects a direction and a position of a line of sight based on a positional relationship between reflected light resulting from reflection of infrared light emitted from the infrared light emitting diode 166 on, in particular, the corneal of the eyeball (eye) 161, and the pupil of the eyeball (eye) 161. Besides that, there are also available various methods for detecting a direction and a position of a line of sight, such as a method called a sclera reflection technique that utilizes a difference between light reflectances of the iris and the sclera of an eye. A line-of-sight detection method different from the above-described examples may be used as long as it is a method capable of detecting a direction and a position of a line of sight.

Various setting values of the digital camera 100 including a shutter speed and an aperture are displayed on the external finder display unit 43 via an external finder display unit driving circuit 44.

A nonvolatile memory 56 is an electrically erasable and recordable memory, and, for example, a flash-read only memory (ROM) is used as the nonvolatile memory 56. The nonvolatile memory 56 stores therein a constant, a program, and the like for an operation of the system control unit 50. The program described here means a program for performing a flowchart that will be described below in the present example embodiment.

The system control unit 50 is a control unit including at least one processor or circuit, and controls the entire digital camera 100. The system control unit 50 realizes each processing procedure in the present example embodiment that will be described below by executing the program recorded in the above-described nonvolatile memory 56. For example, a random access memory (RAM) is used as a system memory 52, and the constant and the variable for the operation of the system control unit 50, the program read out from the nonvolatile memory 56, and the like are developed into the system memory 52. The system control unit 50 also performs display control by controlling the memory 32, the display unit 28, and the like.

A system timer 53 is a time measurement unit that measures a time to be used in various kinds of control, and the time of a built-in clock.

The mode selection switch 60 is an operation member included in the operation unit 70, and switches an operation mode of the system control unit 50 to any of a still image capturing mode, a moving image capturing mode, and the like. Examples of modes included in the still image capturing mode include an automatic imaging mode, an automatic scene determination mode, a manual mode, an aperture priority mode (an aperture value (Av) mode), a shutter speed priority mode (a time value (Tv) mode) and a program AE mode (a P mode). Examples of the modes further include various kinds of scene modes, each of which has a different imaging setting for a corresponding imaging scene, a custom mode, and the like. The user can directly switch the operation mode to any of these modes using the mode selection switch 60. Alternatively, the user may first switch display on the digital camera 100 to a screen displaying a list of the imaging modes using the mode selection switch 60, and then select any of the plurality of modes displayed on the screen and switch the operation mode using another operation member. Similar to the still image capturing mode, the moving image capturing mode may also include a plurality of modes.

A first shutter switch 62 is switched on and generates a first shutter switch signal SW1 halfway through an operation performed on the shutter button 61 disposed on the digital camera 100, i.e., upon so-called half-pressing of the shutter button 61 (an imaging preparation instruction). In response to the first shutter switch signal SW1, an imaging preparation operation, such as the AF (automatic focus) processing, the AE (automatic exposure) processing, the AWB (automatic white balance) processing, and the EF (flash preliminary emission) processing are started.

A second shutter switch 64 is switched on and generates a second shutter switch signal SW2 upon completion of the operation performed on the shutter button 61, i.e., upon so-called full-pressing of the shutter button 61 (an imaging instruction). In response to the second shutter switch signal SW2, the system control unit 50 starts a series of imaging processing operations which are from reading out a signal from the imaging unit 22 to writing a captured image into the recording medium 200 as an image file. In a case where the second shutter switch 64 is kept switched on, the digital camera 100 captures images continuously (continuous imaging) at a speed dependent on a predetermined speed allowed for the continuous imaging.

A power source control unit 80 includes a battery detection circuit, a direct-current-to-direct-current (DC-DC) converter, a switch circuit that changes a block to which power is supplied, and the like. The power source control unit 80 detects whether a battery is mounted, a type of the battery, and a remaining battery level. The power source control unit 80 controls the DC-DC converter based on a result of the detection and an instruction from the system control unit 50, and supplies a required voltage to each unit including the recording medium 200 for a required period. A power source unit 30 includes a primary battery, such as an alkaline battery and a lithium battery, a secondary battery, such as a nickel-cadmium (NiCd) battery, a nickel metal hydride (NiMH) battery, and a lithium (Li) battery, an alternating-current (AC) adapter, and the like.

A recording medium interface (I/F) 18 is an interface with the recording medium 200, such as a memory card and a hard disk. The recording medium 200 is a recording medium, such as a memory card, for recording a captured image, and includes a semiconductor memory, a magnetic disk, or the like.

A communication unit 54 performs a wireless connection or a wireline connection, and transmits and receives a video signal and an audio signal. The communication unit 54 can also be connected to a wireless local area network (LAN) or the Internet. The communication unit 54 can also communicate with an external apparatus using Bluetooth® or Bluetooth® Low Energy. The communication unit 54 can transmit an image captured by the imaging unit 22 (including a live view image) and an image recorded in the recording medium 200, and can receive an image and other various kinds of information from an external apparatus.

An orientation detection unit 55 detects orientation of the digital camera 100 with respect to the direction of gravitational force. It can be determined whether an image captured by the imaging unit 22 is an image captured with the digital camera 100 held in landscape or an image captured with the digital camera 100 held in portrait based on orientation detected by the orientation detection unit 55. The system control unit 50 can, for example, add orientation information according to orientation detected by the orientation detection unit 55 to an image file of an image captured by the imaging unit 22, or record an image obtained after rotating the image. An acceleration sensor, a gyroscope sensor, or the like can be used as the orientation detection unit 55. The motion of the digital camera 100 (for example, whether the digital camera 100 is being panned, tilted, lifted up, or is stationary) can also be detected using an acceleration sensor or a gyroscope sensor serving as the orientation detection unit 55.

The eye proximity detection unit 57 is an eye proximity detection sensor that detects proximity (eye proximity) and separation (eye separation) of the user's eye (an object) 161 to and from the eyepiece unit 16 of the finder (proximity detection). The system control unit 50 switches between display (a display state) and non-display (a non-display state) on the display unit 28 and the EVF 29 according to a state detected by the eye proximity detection unit 57. More specifically, at least when the digital camera 100 is in the imaging standby state and a setting for switching a display destination of a live view image captured by the imaging unit 22 is an automatic switching setting, while eye proximity is absent, the display destination is set to the display unit 28 and the display thereon is turned on, and the EVF 29 is set to the non-display. Further, while an eye proximity state continues, the display destination is set to the EVF 29 and the display thereon is turned on, and the display unit 28 is set to the non-display. The eye proximity detection unit 57 is, for example, an infrared proximity sensor, and can detect proximity of some object to the eyepiece unit 16 of the finder with the EVF 29 built therein. When an object is in proximity to the eyepiece unit 16, an infrared ray projected from a light projection unit (not illustrated) of the eye proximity detection unit 57 is reflected and received by a light receiving unit (not illustrated) of the infrared proximity sensor. The eye proximity detection unit 57 can even determine how close the object is in proximity to the eyepiece unit 16 in terms of a remaining distance from the eyepiece unit 16 (an eye proximity distance) based on the amount of the received infrared rays. In this manner, the eye proximity detection unit 57 performs eye proximity detection for detecting a proximity distance of an object to the eyepiece unit 16. In the present example embodiment, the light projection unit and the light receiving unit of the eye proximity detection unit 57 are different devices from the infrared light emitting diode 166 and the line-of-sight detection sensor 164. However, the infrared light emitting diode 166 may also be used as the light projection unit of the eye proximity detection unit 57. The line-of-sight detection sensor 164 may also be used as the light receiving unit. In a case where an object being in proximity to the eyepiece unit 16 within a predetermined distance from the eyepiece unit 16 is detected in a non-eye proximity state (a non-proximity state), the eye proximity detection unit 57 detects the presence of eye proximity to the eyepiece unit 16. In a case where the object of which proximity to the eyepiece unit 16 has been detected is separated from the eyepiece unit 16 by a predetermined distance or longer in an eye proximity state (a proximity state), the eye proximity detection unit 57 detects the presence of eye separation from the eyepiece unit 16. A threshold value for detecting eye proximity and a threshold value for detecting eye separation may be set to values different from each other by, for example, providing a hysteresis. An eye proximity state continues until eye separation is detected after eye proximity is detected. Non-eye proximity state continues until eye proximity is detected after eye separation is detected. The infrared proximity sensor is merely an example, and the eye proximity detection unit 57 may be realized by a different sensor as long as the sensor can detect proximity of an eye or an object that can be determined as eye proximity.

The system control unit 50 can detect the following operations or states based on an output from the line-of-sight detection block 160.

A line-of-sight input is performed by the user in an eye proximity state to the eyepiece unit 16.

The user in an eye proximity state to the eyepiece unit 16 performs gazing.

The user in an eye proximity state to the eyepiece unit 16 ends gazing for a line-of-sight input. In other words, the line-of-sight input is ended.

The user in an eye proximity state to the eyepiece unit 16 does not performs a line-of-sight input.

The gazing described here refers to a case of when a movement amount of a user's line-of-sight position does not exceed a predetermined amount within a predetermined time.

The touch panel 70a and the display unit 28 can be configured integrally with each other. For example, the touch panel 70a is configured in such a manner that a light transmittance thereof does not disturb display on the display unit 28, and is mounted on an upper layer of the display surface of the display unit 28. Then, an input coordinate on the touch panel 70a and a display coordinate on a display screen on the display unit 28 are associated with each other. This configuration can provide a display object (a graphical user interface) that appears as if the user can directly operate a screen displayed on the display unit 28. The system control unit 50 can detect the following operations onto the touch panel 70a or states of the touch panel 70a.

A finger or a pen that has been out of touch with the touch panel 70a newly touches the touch panel 70a. In other words, a touch is started (hereinafter referred to as a Touch-Down).

The touch panel 70a is in a state of being touched by the finger or the pen (hereinafter referred to as a Touch-On).

The finger or the pen is being moved while keeping touching the touch panel 70a (hereinafter referred to as a Touch-Move).

The finger or the pen that has been in touch with the touch panel 70a is separated from the touch panel 70a. In other words, the touch is ended (hereinafter referred to as a Touch-Up).

Nothing is touching the touch panel 70a (hereinafter referred to as a Touch-Off).

In a case where a Touch-Down is detected, a start of a Touch-On is also detected at the same time. After the Touch-Down, the detection of the Touch-On normally continues as long as a Touch-Up is not detected. A Touch-Move is detected also in a state that a Touch-On is detected. Even in a case where a Touch-On is detected, a Touch-Move is not detected unless the touched position is being moved. After detection of a Touch-Up of all of the finger(s) or the pen(s) that has/have been in touch with the touch panel 70a, a Touch-Off is detected.

The system control unit 50 is notified of these operations and states and the positional coordinate touched by the finger or the pen on the touch panel 70a via an internal bus. The system control unit 50 determines what kind of operation (touch operation) is performed on the touch panel 70a based on information which the system control unit 50 is notified of. Regarding a Touch-Move, the system control unit 50 can also determine a movement direction of the finger or the pen in motion on the touch panel 70a, based on a change in the positional coordinate for each of a vertical component and a horizontal component on the touch panel 70a. The system control unit 50 determines that a slide operation is performed in a case where detecting a Touch-Move performed by a predetermined distance or longer. An operation of quickly moving the finger only by a certain distance while keeping the finger in touch on the touch panel 70a, and separating the finger from the touch panel 70a directly therefrom will be referred to as a flick. In other words, a flick is an operation of quickly running the finger on the touch panel 70a as if flicking on the touch panel 70a with the finger. The system control unit 50 can determine that a flick is performed when detecting a Touch-Move performed by a predetermined distance or longer at a predetermined speed or higher and detecting a Touch-Up subsequent to the Touch-Move (can determine that a flick is performed subsequently to the slide operation). Further, a touch operation of touching a plurality of portions (for example, two points) at the same time and moving the respective touched positions toward each other will be referred to as a pinch-in, and a touch operation of moving the respective touched positions away from each other will be referred to as a pinch-out. A pinch-out and a pinch-in will be collectively referred to as a pinch operation (or simply a pinch). The touch panel 70a may employ any touch panel among touch panels working based on various methods, such as the resistive film method, the capacitive method, the surface acoustic wave method, the infrared method, the electromagnetic induction method, the image recognition method, and the optical sensor method. Possible detection types include a type that detects a touch input according to the presence of a touch onto the touch panel 70a, and a type that detects a touch input according to the presence of approach of the finger or the pen to the touch panel 70a, depending on the method of the touch panel 70a, and the touch panel 70a may employ any type of them.

In the present example embodiment, a description will be given of processing for controlling an AF function based on the line-of-sight input operation and user's eye proximity/eye separation on the digital camera 100.

Figure 3:
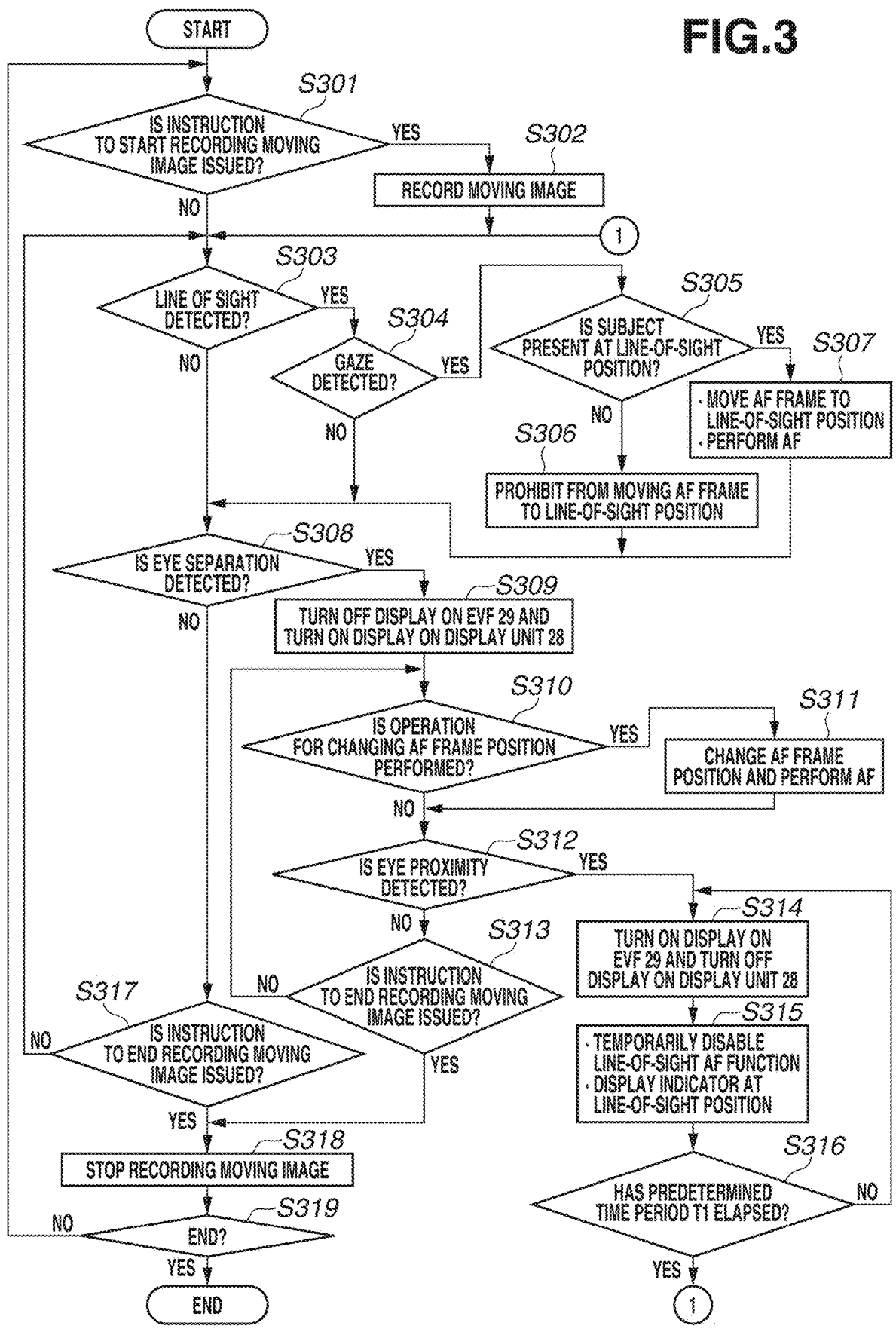
FIG. 3 is a flowchart illustrating control of a line-of-sight automatic focus (AF) function of when an eye is in proximity to a finder according to one embodiment.

FIG. 3 is a flowchart of controlling the AF function using a line of sight in recording a moving image according to the line-of-sight input and user's eye proximity/eye separation to and from the digital camera 100. This control processing is realized by the system control unit 50 developing the program stored in the nonvolatile memory 56 into the system memory 52 and executing the program. The flowchart illustrated in FIG. 3 is started when the digital camera 100 is started up in the imaging mode and the user is looking into the finder in the imaging standby state, i.e., in a state where the user is in an eye proximity state to the eyepiece unit 16. An LV image captured by the imaging unit 22 in the imaging mode is displayed on the EVF 29 when the flowchart illustrated in FIG. 3 is started. At this time, a line-of-sight input setting is enabled and a line-of-sight AF setting is enabled, as setting contents regarding the line-of-sight input.

Figure 5:
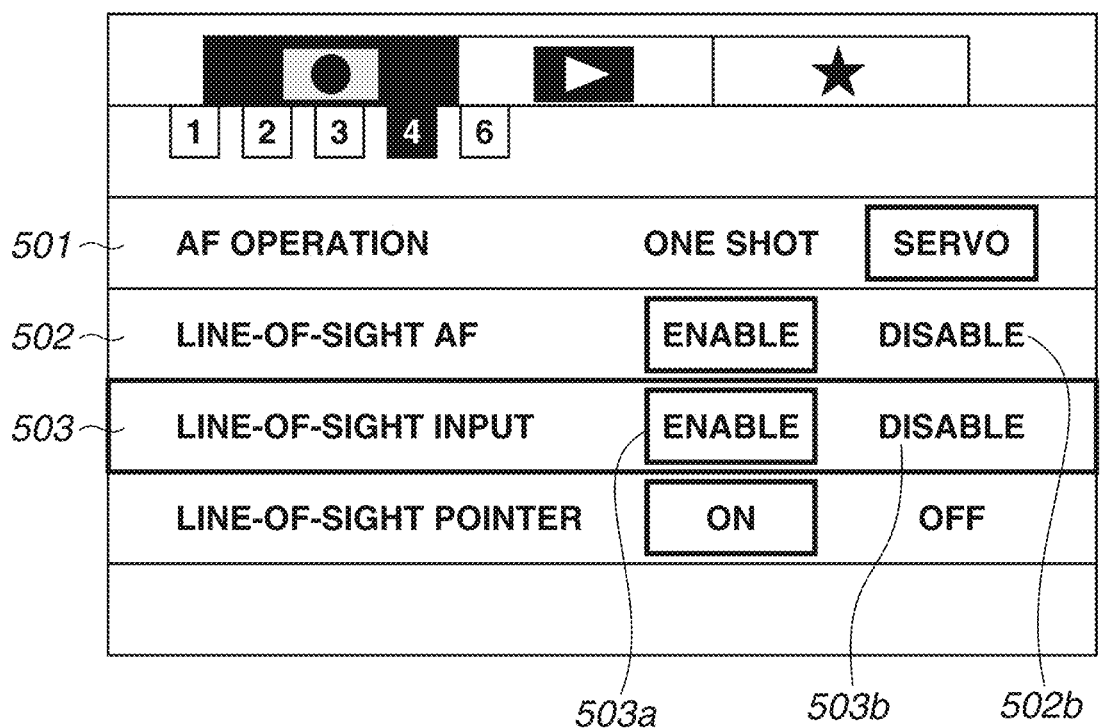
FIG. 5 is a diagram illustrating a setting menu screen regarding a line-of-sight input of a user according to one embodiment.

Specifically, items of functions regarding AF and the line-of-sight input like the examples illustrated in FIG. 5 can be set on a setting menu of the line-of-sight input. The line-of-sight AF indicated at an item 502 refers to a function of moving an AF frame representing a region for the automatic focus adjustment based on the user's line of sight. The line-of-sight AF function can be enabled and disabled. In a case where the line-of-sight AF function is enabled, the AF frame (an AF execution position) can be selected and moved by a line-of-sight input. In a case where the line-of-sight AF function is disabled, the AF frame (the AF execution position) is prohibited from being selected and moved by a line-of-sight input. The line-of-sight input indicated at an item 503 refers to a function about whether to detect a user's line of sight. In a case where the line-of-sight input is enabled, the line-of-sight detection block 160 is in a started-up state, and a user's line of sight can be detected. In a case where the line-of-sight input is disabled, the line-of-sight detection block 160 is not started up and a user's line of sight is not detected. In a case where the line-of-sight input at the item 503 is not enabled, the line-of-sight AF at the item 502 does not function even in a case where the line-of-sight AF at the item 502 is enabled. FIG. 5 illustrates that the line-of-sight input is enabled and the line-of-sight AF is enabled.

In step S301, the system control unit 50 determines whether an instruction to start recording a moving image is issued. In a case where an instruction to start recording a moving image is issued (YES in step S301), the processing proceeds to step S302. In a case where an instruction to start recording a moving image is not issued (NO in step S301), the processing proceeds to step S303. The instruction to start recording a moving image refers to, for example, pressing of the moving image button 76 or a touch onto a touch button of an apparatus capable of remote controlling the digital camera 100 to start recording a moving image.

In step S302, the system control unit 50 starts recording a moving image. More specifically, the system control unit 50 generates a moving image file in the recording medium 200 and records a moving image captured by the imaging unit 22 in accordance with current setting contents.

In step S303, the system control unit 50 determines whether a line-of-sight input is present. In a case where a line-of-sight input is present, i.e., a user's line of sight is detected by the line-of-sight detection block 160 (YES in step S303), the processing proceeds to step S304. In a case where no line-of-sight input is present, i.e., a user's line of sight is not detected by the line-of-sight detection block 160 (NO in step S303), the processing proceeds to step S308. In a case where a line-of-sight input is present (YES in step S303), the system control unit 50 measures a time from when a moment at which the line-of-sight input is started. In response to detection of eye separation from the eyepiece unit 16, the system control unit 50 resets the time measurement after stopping the time measurement, and restarts the time measurement in response to detection of eye proximity.

In step S304, the system control unit 50 determines whether a gaze is present. In a case where a gaze is present (YES in step S304), the processing proceeds to step S305. In a case where no gaze is present (NO in step S304), the processing proceeds to step S308. Regarding a line-of-sight position detected by the line-of-sight detection block 160, the line-of-sight position is detected, for example, per 30 msec, and is transmitted to the system control unit 50. The system control unit 50 determines that a gaze is present when a movement amount of the line-of-sight position within some specific time is equal to or smaller than a predetermined threshold value based on the line-of-sight position and the measured time. Time period T2 represents a time for determining a gaze. the time period T2 is set to a shorter time than a predetermined time period T1 (which will be described below), which is a determination time for temporarily disabling the line-of-sight AF function (T2<T1), which will be described below. For example, in a case of T2=120 msec, the system control unit 50 determines that a gaze is present when a movement amount of the line-of-sight position is smaller than or equal to the predetermined threshold value within 120 msec. The system control unit 50 determines that no gaze is present when a movement amount of the line-of-sight position is greater than the predetermined threshold value, based on the line-of-sight position and the measured time, i.e., the user is largely moving his/her line of sight. The present example has been described citing a gaze as a condition for determining that a detected line-of-sight position is a line-of-sight position intended by the user with respect to a movement of a display position of the focus detection region (hereinafter referred to as the AF frame) based on the line-of-sight input, but a user's blink, an audio instruction, or the like may be used as the condition. The time period T2 for determining a gaze has been described using 120 msec as a specific example, but the time period T2 may be set in advance, may be freely set by the user, or may be changed according to a positional relationship between a displayed line-of-sight position and a gaze position.

In step S305, the system control unit 50 determines whether a subject is present at the user's line-of-sight position. In a case where a subject is absent (NO in step S305), the processing proceeds to S306. In a case where a subject is present (YES in step S305), the processing proceeds to S307. Specifically, the presence of a subject refers to a case of when a face of a human or an animal such as a dog, cat, and a bird can be detected in the LV image captured via the imaging unit 22. On the other hand, the absence of a subject refers to a case of when a face of a human or an animal such as the above-described examples cannot be detected. Even in a case where a body of a human or an animal can be detected, the system control unit 50 determines that a subject is absent while no face can be detected. In the present example embodiment, the system control unit 50 determines that a subject is present not only when a face can be detected but also when an organ (a part) of a face such as an eye and a nose can be detected.

In step S306, the system control unit 50 does not move the AF frame to the user's line-of-sight position (the gaze position) detected by the line-of-sight detection block 160. Since the absence of a subject at the user's line-of-sight position can be determined based on the determination in step S305, it is possible that the user views some one point unintentionally, or the line-of-sight position detected by the line-of-sight detection block 160 may be offset from a position that the user is actually viewing. In such a case, if the AF processing is performed inappropriately at a position in the LV image where no subject is present, for example, AF may be undesirably performed on infinity and create a user's confusion. The user may even lose an imaging opportunity due to the execution of AF on infinity while the moving image is recorded. Thus, the system control unit 50 does not move the AF frame to the line-of-sight position even in a case where the line-of-sight AF is enabled (even if a temporary disabled state of the line-of-sight AF is cancelled), when no subject is present at the line-of-sight position.

Figure 4A:
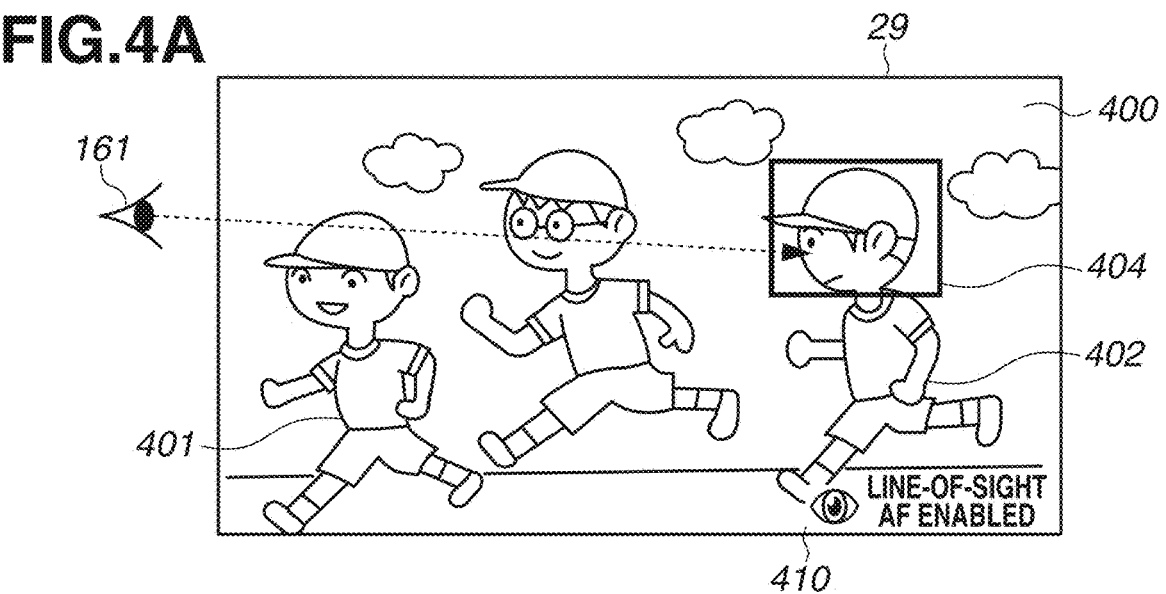
FIGS. 4A, 4B, and 4C are diagrams each illustrating a display example which is displayed on an electronic view finder (EVF) when an eye is proximity to the finder according to one embodiment.

In step S307, the system control unit 50 moves the AF frame to the subject at the user's line-of-sight position detected by the line-of-sight detection block 160, and performs the AF processing. FIG. 4A illustrates a display example at this processing. In a case the determination in step S304 is YES while the user's eye 161 views the face of a subject 402, an indicator 404 serving as the AF frame is displayed on or moved to the subject 402 as illustrated in FIG. 4A, and then the AF processing is performed. If the user's eye 161 changes to a state viewing a subject 401 (FIG. 4C), the indicator 404 is moved to the subject 401, and the AF processing is performed to the subject 401. In this processing, the line-of-sight AF is enabled and thus the user is notified using an icon and characters as indicated by a display item 410 that the line-of-sight AF is enabled. The display item 410 is displayed together with the LV image in this processing.

In step S308, the system control unit 50 determines whether eye separation from the eyepiece unit 16 is detected. In a case where eye separation is detected (YES in step S308), the processing proceeds to step S309. In a case where no eye separation is detected (i.e., the eye proximity continues) (NO in step S308), the processing proceeds to step S317.

In step S309, the system control unit 50 turns off the display on the EVF 29 and turns on the display on the display unit 28. In other words, the system control unit 50 switches the display destination to display the LV image having been displayed on the EVF 29 on the display unit 28. This processing is for a case where the setting regarding the display destination of the LV image by the user is set to the automatic setting. If the setting regarding the display destination is set to, for example, display the LV image only on the EVF 29 (a finder display setting), the system control unit 50 does not perform control of switching the display destination even in a case where the eye separation performed by the user is detected (determines YES in step S308).

In step S310, the system control unit 50 determines whether an operation for changing the AF frame position (the AF target) is performed by the user. In a case where a change operation is performed (YES in step S310), the processing proceeds to step S311. In a case where a change operation is not performed (NO in step S310), the processing proceeds to step S312. The operation for changing the AF frame position refers to, for example, a touch operation onto the touch panel 70*a* or an operation on the up, down, left, or right key of the cross key 74.

In step S311, the system control unit 50 moves the display position of the AF frame according to the change operation detected in step S310, to change the AF execution target. Since the user is not in the eye proximity state to the eyepiece unit 16 according to the determinations of YES in steps S308 and S310, it is possible that the user views the LV image displayed on the display unit 28 instead of the LV image displayed on the EVF 29. Thus, the AF frame, which is to be displayed together with the LV image on the EVF 29 or the display unit 28, is moved to the subject (the position) according to the user's operation.

In step S312, the system control unit 50 determines whether eye proximity to the eyepiece unit 16 is detected. In a case where eye proximity is detected (YES in step S312), the processing proceeds to step S314. In a case where no eye proximity is detected (i.e., the eye separation continues) (NO in step S312), the processing proceeds to step S313. In a case where eye proximity is detected, the system control unit 50 starts the time measurement of the predetermined time period T1. The system control unit 50 performs control of starting the time measurement of only the predetermined time period T1 in step S312 and start the time measurement of the time T2 after the predetermined time period T1 has elapsed (YES in step S316) in the present example embodiment, but is not limited thereto. More specifically, the system control unit 50 may be configured to start both the time measurement of the predetermined time period T1 and the time measurement of the time period T2 in this processing. In the case of such control, since T1>T2, the temporary disabled state of the line-of-sight AF function is not cancelled until the predetermined time period T1 has elapsed even when the time period T2 has elapsed. More specifically, the time period T2 is also determined to have elapsed at the same time that the predetermined time period T1 has elapsed, and a gaze is determined to be present at the same time that the predetermined time period T1 has elapsed. In the case where the system control unit 50 is configured to perform control of starting the time measurement of the time period T2 after the predetermined time period T1 has elapsed, the line-of-sight AF function is not enabled until a condition requiring the elapse of the time period T1+T2 is satisfied, and consequently execution of the line-of-sight AF function unintended by the user can be reduced. On the other hand, in the case where the system control unit 50 is configured to perform control of starting the time measurement of the predetermined time period T1 and the time measurement of the time period T2 at the same time, the user only has to wait for the elapse of the predetermined time period T1, and consequently the user who specifies the AF frame position using the line-of-sight AF function can less feel inconvenient toward the time during which the temporary disabled state continues.

In step S313, the system control unit 50 determines whether an instruction to stop recording the moving image is issued. In a case where a stop instruction is issued (YES in step S313), the processing proceeds to step S318. In a case where a stop instruction is not issued (NO in step S313), the processing returns to step S310. Specifically, the instruction to stop recording the moving image refers to pressing of the moving image button 76.

In step S314, the system control unit 50 turns off the display on the display unit 28 and turns on the display on the EVF 29. In other words, the system control unit 50 switches the display destination to display the LV image having been displayed on the display unit 28 on the EVF 29.

Figure 4B:
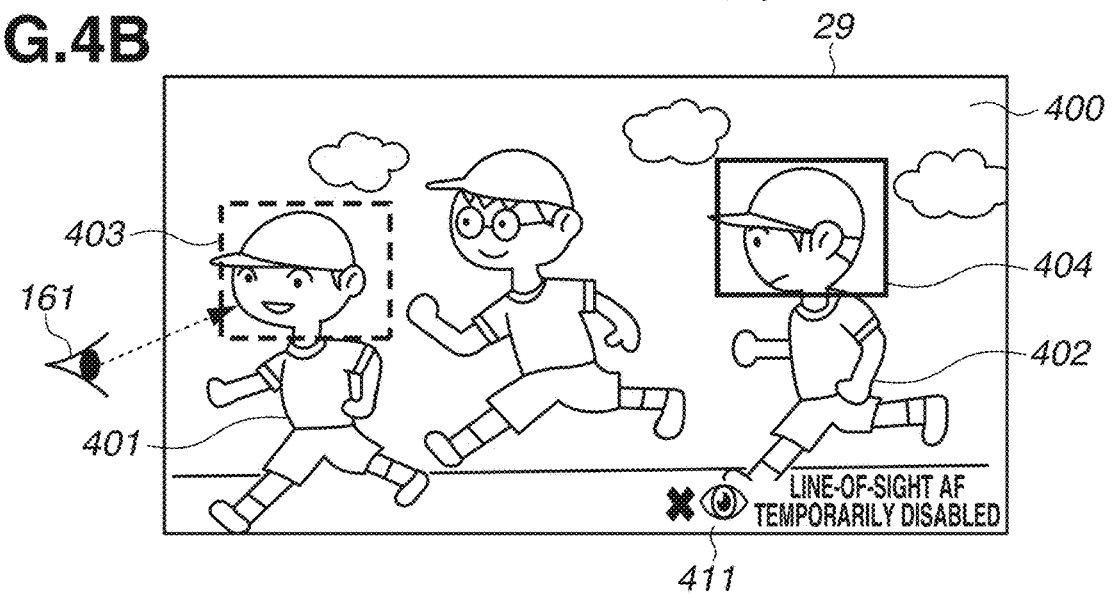

In step S315, the system control unit 50 temporarily disables the line-of-sight AF function. In this processing, the system control unit 50 continues the detection of the user's line-of-sight position by the line-of-sight detection block 160, and displays an indicator different from the AF frame (an indicator 403 illustrated in FIG. 4B) at the detected line-of-sight position. The system control unit 50 displays an icon indicating that execution of the AF processing based on the line-of-sight input is disabled, to notify the user. FIG. 4B illustrates a display example in this processing. FIG. 4B illustrates a state that the line-of-sight AF is temporarily disabled while the indicator 404 serving as the AF frame is displayed on the subject 402 and the AF processing is performed thereon, and the user's eye 161 views the subject 401. Before the determination in step S312 is YES, i.e., before the user's eye 161 is in proximity to the eyepiece unit 16, the AF frame is displayed on the subject 402 and the AF processing is performed thereon, and the AF execution position is indicated by the indicator 404 (FIG. 4A). The indicator 403 is displayed on the subject 401, which is the user's line-of-sight position, until the predetermined time period T1 has elapsed after the user's eye 161 is in proximity to the eyepiece unit 16. The AF processing is not performed at the display position indicated by the indicator 403. When the user's eye 161 is in proximity to the eyepiece unit 16 while recording the moving image, the user may, for example, widely scan a content of the LV image to check the composition or search for a subject. The AF processing at the line-of-sight position by the line-of-sight AF function at this time may lead to the unintentional execution of AF at a position (a subject) not desired by the user, which may cause inconvenience for the user. Thus, the line-of-sight AF is temporarily disabled until the predetermined time period T1 has elapsed after the eye proximity. Because the line-of-sight AF is enabled by the user, disabling the line-of-sight AF even temporarily may create confusion. Thus, a display item 411 indicating that the line-of-sight AF is disabled is displayed together with the LV image. In the present example embodiment, the indicator 403 is displayed in such a manner that a normal display state of the AF frame (for example, the indicator 404 illustrated in FIG. 4A) blinks, but is not limited thereto. Any display manner may be used as long as the user can visually recognize that the indicator 403 is an indicator different from the AF frame. The AF processing is not performed at the display position of the indicator 403 at this time. The execution of the AF processing at the AF execution position (the subject) before eye proximity continues while the line-of-sight AF is temporarily disabled.

In step S316, the system control unit 50 determines whether the predetermined time period T1 has elapsed. In a case where the predetermined time period T1 has elapsed (YES in step S316), the processing returns to step S303. In a case where the predetermined time period T1 has not elapsed (NO in step S316), the processing returns to step S314. Specifically, the predetermined time period T1 in the present example embodiment is a time of approximately one second. This predetermined time period T1 can be arbitrarily set by the user on a setting menu screen. However, the predetermined time period T1 is set to a longer time than the time period T2 for determining a gaze, which has been described in step S304 (T1>T2). Since this setting prevents the AF frame from being moved to a line-of-sight position until the predetermined time period T1 immediately after detection of eye proximity has elapsed even when the time period T2 has elapsed with the line of sight kept fixed, movement of the AF frame and execution of the AF processing unintended by the user can be prevented.

In step S317, the system control unit 50 determines whether an instruction to stop recording the moving image is issued similarly to step S313. In a case where a stop instruction is issued (YES in step S317), the processing proceeds to step S318. In a case where a stop instruction is not issued (NO in step S317), the processing returns to step S303.

In step S318, the system control unit 50 stops recording the moving image. When the imaging is stopped, the system control unit 50 performs processing for closing the moving image file generated in the recording medium 200 (for example, assigning attribute information thereto). Pressing the moving image button 76 has been described as the instruction to stop recording the moving image in step S317, but, when a mode switching operation is performed, the playback button 79 is pressed (an instruction to transition to playback mode processing), or the power switch 72 is operated, the system control unit 50 stops recording the moving image and performs control processing for each of them. The instruction to stop recording the moving image in step S317 also includes a stop of the recording of the moving image not derived from the user's intention but due to an insufficient available space in the recording medium 200 or an increase in the temperature of a casing of the digital camera 100.

In step S319, the system control unit 50 determines whether the processing is ended. In a case where the processing is ended (YES in step S319), the control flowchart illustrated in FIG. 3 is ended. In a case where the processing is not ended (NO in step S319), the processing returns to step S301. The end of the processing refers to, for example, a transition from the imaging mode to the playback mode (a playback screen on which an image is played back), a transition from the playback mode to the imaging mode, and a power-off of the digital camera 100.

In a case where the indicator displayed at the user's line-of-sight position and the AF frame overlap each other over a predetermined area or more (or a gaze is present at a subject position on which the AF frame is displayed) in step S316, the system control unit 50 may cancel the temporary disabled state of the line-of-sight AF function without waiting for the elapse of the predetermined time period T1. Similarly, the system control unit 50 may cancel the temporary disabled state of the line-of-sight AF function without waiting for the elapse of the predetermined time period T1 in step S316, when the digital camera 100 is subjected to, for example, a panning operation, a tilting operation, a rolling operation, and a zoom operation, which lead to a considerable change in composition in the LV image. Change in composition can be determined using a gyroscope sensor or an acceleration sensor provided in the digital camera 100. When the user's line-of-sight position and a temporarily fixed (tracked) subject match each other like the above-described example during the period in which the line-of-sight AF function is temporarily disabled, the user highly likely casts the line of sight to the subject intentionally and wants the AF frame to move by following the movement of the line of sight after that. When composition is considerably changed, a subject selected before the detection of eye proximity (before step S312) is highly likely no longer present in the LV image, and the user may want to immediately select a new subject with new composition. For these reasons, the system control unit 50 performs control to cancel the temporary disabled state of the line-of-sight AF function without waiting for the elapse of the predetermined time period T1 and display or move the AF frame on or to the line-of-sight position, to perform the AF processing.

A description will be given of a case where an operation on an operation member such as a touch operation onto the touch panel 70a or pressing of a button provided in the digital camera 100 is performed by the user before the predetermined time period T1 has elapsed in step S316 after the eye proximity has been detected in step S312. When such an operation is performed by the user, the system control unit 50 cancels the temporary disabled state of the line-of-sight AF function without waiting for the elapse of the predetermined time period T1, and moves the AF frame to the user's line-of-sight position and performs the AF processing (enables the line-of-sight AF function). For example, the user may want to make a fine adjustment of the AF frame displayed on the EVF 29 with a Touch-Move onto the touch panel 70a. In such a case, the user may be confused if the temporary disabled state of the line-of-sight AF function continues even when the touch operation is performed onto the touch panel 70a. There is also a case in which movement of the AF frame, transition to another mode, and the like based on a user operation can be determined to be performed with user's clear intention. Further, the user may want the digital camera 100 to perform the AF processing at the line-of-sight position quickly even immediately after putting an eye to the finder. Under such a situation, the user may lose an imaging opportunity if the line-of-sight AF function cannot be used until the predetermined time period T1 has elapsed. The digital camera 100 can understand the user's clear intention by input of a user operation. Therefore, when an operation on an operation member is performed by the user in the above-described manner, cancelling the temporary disabled state of the line-of-sight AF function little likely conflicts with the user's intention.

The line-of-sight AF function of performing the AF processing (the automatic focus adjustment) at the position of the user's line-of-sight input has been described in the present example embodiment, but the function which is executed at the position of the line-of-sight input is not limited thereto. For example, the digital camera 100 may be configured to perform a function of the AWB processing or the AE processing at the position of the line-of-sight input. The digital camera 100 may be configured to execute a plurality of functions instead of the above-described functions individually.

Figure 4C:
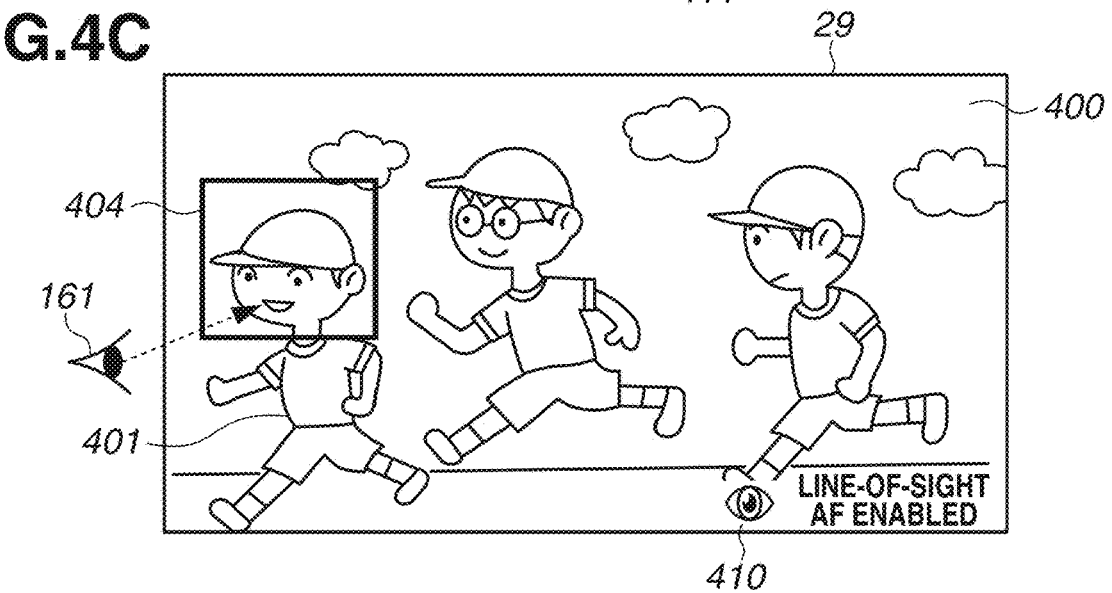

The display manners of the indicator 403 and the display item 410 illustrated in FIGS. 4A to 4C are not limited to these examples. The indicator 403 is displayed in such a manner that the frame display looking like the AF frame blinks, but is not limited to the frame display and may be displayed like a circular pointer. The display item 410 is displayed in the form of an icon and characters, but may be only an icon or may be only characters. The display item 410 may be displayed in such a manner that, for example, a red frame is displayed along the outer periphery of the display range on the EVF 29.

In a case where an eye is in proximity to the eyepiece unit 16 without the AF frame displayed on the LV image displayed on the EVF 29 in the control flowchart illustrated in FIG. 3, the system control unit 50 may enable the line-of-sight AF function without waiting for the elapse of the predetermined time period T1. When an eye is in proximity to the eyepiece unit 16 without the AF frame displayed on the LV image displayed on the EVF 29 means when the user powers on the digital camera 100 and puts an eye to the eyepiece unit 16 for the first time. The temporary disabled state of the line-of-sight AF function at this time creates confusion for the user who has enabled the line-of-sight AF function on the contrary, or undesirably makes this user feel it little user-friendly. Thus, the system control unit 50 may not temporarily disable the line-of-sight AF function.

According to the above-described present example embodiment, the line-of-sight AF function is controlled to be temporarily disabled immediately after the user's eye is in proximity to the finder. As a result, the AF frame is prevented from being displayed on or moved to an undesired position when the user, for example, largely moves the line of sight to check an entire LV image or observes a part of the LV image immediately after detection of the eye proximity. Since the AF frame is prevented from being displayed on or moved to a position not intended by the user, the AF processing is prevented from being performed at an unintended position. While the moving image is being recorded, the present example embodiment can reduce unintentional recording of the moving image focused on an undesired position, and therefore the loss of the imaging opportunity can be reduced.

Regarding the above-described various kinds of control that have been described using a case in which the system control unit 50 performs them, a single hardware device may perform them, or a plurality of hardware devices (for example, a plurality of processors or circuits) may control the entire apparatus by sharing the processing among them.

As noted above, the present invention is not limited to the above described specific example embodiments. It also covers various other embodiments within a range that does not depart from the spirit of the present invention. Further, each of the above-described example embodiments merely indicates one example embodiment of the present disclosure, and each of the example embodiments can also be combined as appropriate.

The above-described example embodiments have been described referring to the example in which the present invention is applied to a digital camera, but are not limited to this example and can also be applied to an imaging apparatus capable of detecting a line of sight of a user's eye in proximity to a finder, such as a video camera.

Other Example Embodiments

The present disclosure can also be realized by performing the following processing. That is, the present disclosure can also be realized by processing that supplies software (a program) capable of fulfilling the functions of the above-described example embodiments to a system or an apparatus via a network or various kinds of storage media, and causes a computer (or a central processing unit (CPU), a micro processing unit (MPU), or the like) of this system or apparatus to read out and execute a program code. In this case, this program, and the storage medium storing this program therein shall constitute the present invention.

According to various embodiments of the present disclosure, it is possible to reduce the execution of unintended processing based on a line of sight immediately after detection of an eye proximity.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-176362, filed Oct. 20, 2020, which is hereby incorporated by reference herein in its entirety.

What is claimed is:

1. An imaging apparatus comprising:
   a finder; and
   at least one memory and at least one processor which function as:
   a proximity detection unit configured to detect proximity of an object to the finder,
   a line-of-sight detection unit configured to detect a line of sight of a user looking into the finder, and
   a control unit configured to perform control to prohibit the imaging apparatus from performing a specific function based on a line of sight position of the user detected by the line-of-sight detection unit until a first period of time has elapsed after the proximity of the object is detected by the proximity detection unit even in a case where a predetermined condition is satisfied, and allow the imaging apparatus to perform the specific function based on a line of sight position of the user detected by the line-of-sight detection unit, after the first period of time has elapsed after the proximity of the object is detected by the proximity detection unit, in response to satisfaction of the predetermined condition,
   wherein the predetermined condition is a condition that a gaze is determined to be present, and
   wherein, in a case where a movement amount of a position at which the line-of-sight is detected within a second period of time shorter than the first period of time is equal to or smaller a predetermined threshold value, the control unit determines that the gaze is present.

2. The imaging apparatus according to claim 1, wherein the specific function is at least one of functions regarding an automatic focus adjustment, automatic white balance, or an automatic exposure.

3. The imaging apparatus according to claim 1, wherein, after the proximity of the object is detected by the proximity detection unit, and in a case where an operation is performed on an operation member by the user before elapse of the first period of time, the control unit performs the specific function based on a position input by the line-of-sight input of the user.

4. The imaging apparatus according to claim 1, wherein the control unit performs the control while a moving image is recorded.

5. The imaging apparatus according to claim 1, further comprising:
an imaging unit,
wherein the control unit displays a live view image captured by the imaging unit on a display unit in the finder, and
wherein the control unit performs the specific function by a gaze of the user on the live view image.

6. The imaging apparatus according to claim 1, wherein the control unit displays, after the proximity of the object is detected, an icon indicating that the specific function is not performed, on a display unit until the first period of time has elapsed.

7. The imaging apparatus according to claim 1, wherein the control unit displays, after the proximity of the object is detected by the proximity detection unit, a first indicator indicating a position input by the line-of-sight input of the user and a second indicator different from the first indicator and indicating a position at which the specific function is performed, until the first period of time has elapsed, and in a case where a subject is present at the position input by the line-of-sight input of the user after the first period of time has elapsed, performs the specific function based on the position input by the line-of-sight input of the user.

8. The imaging apparatus according to claim 7, wherein the second indicator indicates a region where an automatic focus adjustment is performed.

9. The imaging apparatus according to claim 1, wherein in a case where an operation is performed on an operation member by the user before an elapse of the first period of time, the control unit performs the specific function based on a position input by the line-of-sight input of the user even before the elapse of the first period of time.

10. A control method for controlling an imaging apparatus that includes a finder, the control method comprising:
detecting proximity of an object to the finder;
detecting a line of sight of a user looking into the finder; and
performing control to prohibit the imaging apparatus from performing a specific function based on a line of sight position of the user detected by the line-of-sight detection unit until a first period of time has elapsed after the proximity of the object is detected by the proximity detection unit even in a case where a predetermined condition is satisfied, and allow the imaging apparatus to perform the specific function based on a line of sight position of the user detected by the line-of-sight detection unit, after the first period of time has elapsed after the proximity of the object is detected by the proximity detection unit, in response to satisfaction of the predetermined condition,
wherein the predetermined condition is a condition that a gaze is determined to be present, and
wherein, in a case where a movement amount of a position at which the line-of-sight is detected within a second period of time shorter than the first period of time is equal to or smaller a predetermined threshold value, the control unit determines that the gaze is present.

11. A non-transitory computer-readable recording medium that stores a program for causing a computer to execute a control method for an imaging apparatus that includes a finder, the control method comprising:
detecting proximity of an object to the finder;
detecting a line of sight of a user looking into the finder; and
performing control to prohibit the imaging apparatus from performing a specific function based on a line of sight position of the user detected by the line-of-sight detection unit until a first period of time has elapsed after the proximity of the object is detected by the proximity detection unit even in a case where a predetermined condition is satisfied, and allow the imaging apparatus to perform the specific function based on a line of sight position of the user detected by the line-of-sight detection unit, after the first period of time has elapsed after the proximity of the object is detected by the proximity detection unit, in response to satisfaction of the predetermined condition,
wherein the predetermined condition is a condition that a gaze is determined to be present, and
wherein, in a case where a movement amount of a position at which the line-of-sight is detected within a second period of time shorter than the first period of time is equal to or smaller a predetermined threshold value, the control unit determines that the gaze is present.

* * * * *